United States Patent
Yoo et al.

(10) Patent No.: US 7,760,322 B2
(45) Date of Patent: Jul. 20, 2010

(54) ARRAY SUBSTRATE FOR LIQUID CRYSTAL DISPLAY DEVICE HAVING DEFECT REPAIR STRUCTURE

(75) Inventors: Soon Sung Yoo, Gyeonggi-do (KR); Youn-Gyoung Chang, Gyeonggi-do (KR); Heung Lyul Cho, Gyeonggi-do (KR); Seung Hee Nam, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 899 days.

(21) Appl. No.: 11/453,823

(22) Filed: Jun. 16, 2006

(65) Prior Publication Data
US 2006/0285029 A1    Dec. 21, 2006

(30) Foreign Application Priority Data
Jun. 17, 2005    (KR) .................... 10-2005-0052343

(51) Int. Cl.
  *G02F 1/13*    (2006.01)
  *G02F 1/1333*  (2006.01)
  *G02F 1/1343*  (2006.01)
(52) U.S. Cl. ..................... 349/192; 349/54; 349/55; 349/38; 349/39
(58) Field of Classification Search ............. 349/192, 349/38–39, 42–43, 54–55, 129; 345/92; 257/59, 72
See application file for complete search history.

(56) References Cited

U.S. PATENT DOCUMENTS

| | | | | |
|---|---|---|---|---|
| 5,995,178 A | * | 11/1999 | Fujikawa et al. | 349/55 |
| 6,307,602 B1 | * | 10/2001 | Song | 349/38 |
| 6,326,641 B1 | * | 12/2001 | Choi | 257/57 |
| 6,985,194 B2 | * | 1/2006 | Kawano et al. | 349/54 |
| 7,414,697 B1 | * | 8/2008 | Choi et al. | 349/192 |
| 2003/0043307 A1 | * | 3/2003 | Nakayama et al. | 349/43 |

FOREIGN PATENT DOCUMENTS

JP    02002278476 A    *    9/2002

* cited by examiner

*Primary Examiner*—Hoan C Nguyen
(74) *Attorney, Agent, or Firm*—Holland & Knight LLP

(57) ABSTRACT

An array substrate for a liquid crystal display device includes a gate line and a first storage electrode on a substrate, a data line crossing the gate line to define a first pixel region, a thin film transistor connected to the gate line and the data line, a second storage electrode over the first storage electrode, a first pixel electrode in the first pixel region, the first pixel electrode connected to the thin film transistor and the second storage electrode, the second storage electrode including a first portion over the first storage electrode and a second portion in a second pixel region adjacent to the first pixel region, and a repair pattern for the first pixel region between the second storage electrode and a second pixel electrode in the second pixel region.

14 Claims, 13 Drawing Sheets

ARRAY SUBSTRATE FOR LIQUID CRYSTAL DISPLAY DEVICE HAVING DEFECT REPAIR STRUCTURE

The present invention claims the benefit of Korean Patent Application No. P2005-0052343 filed in Korea on Jun. 17, 2005, which is hereby incorporated by reference in its entirety.

BACKGROUND OF THE INVENTION

1. Field of The Invention

The present invention relates to a liquid crystal display device (LCD), and more particularly, to an array substrate for an LCD, a method of fabricating the array substrate, and a repairing method of the array substrate.

2. Discussion of The Related Art

Generally, an LCD device uses optical anisotropy and polarization properties of liquid crystal molecules to display an image. The liquid crystal molecules have an alignment direction along their thin and long shapes. The alignment direction of the liquid crystal molecules can be controlled by applying an electric field to the liquid crystal molecules. In other words, as the intensity of the electric field is changed, the orientation of the alignment direction for the liquid crystal molecules also changes. Since incident light through liquid crystal molecules is refracted based on the orientation of the liquid crystal molecules, due to the optical anisotropy of the aligned liquid crystal molecules, intensity of the incident light can be controlled such that images can be displayed.

Among the various types of LCD devices commonly used, active matrix LCD (AM-LCD) devices having thin film transistors (TFTs) with pixel electrodes connected to the TFTs disposed in matrix form have high resolution and superiority in displaying moving images. FIG. 1 is a schematic perspective view of an active matrix liquid crystal display device according to the related art. As shown in FIG. 1, an LCD device includes a first substrate 80 having a transparent common electrode 92 on a color filter layer 89 including red, green and blue sub-color filters 89a to 89c and a black matrix 85 between the adjacent red, green and blue sub-color filters 89a to 89c, and a second substrate 10 having a pixel electrode 60, a switching element "Tr" and array lines. Further, a layer of liquid crystal molecules 70 is interposed between the first and second substrates 80 and 10. The first and second substrates 80 and 10 are commonly referred to as a color filter substrate and an array substrate, respectively. The switching element "Tr," for example, is a thin film transistor (TFT) disposed in a matrix arrangement and connected to a gate line 13 and a data line 30 crossing each other. A pixel region "P" is defined at a crossing portion of the gate line 13 and the data line 30. The pixel electrode 60 is made of a transparent conductive material disposed in the pixel region "P."

The LCD device is driven with an electro-optical effect on the liquid crystal molecules 70. Since the liquid crystal molecules 70 have dielectric anisotropy and spontaneous polarization, a dipole is formed in the layer of liquid crystal molecules 70 when a voltage is applied across the layer of liquid crystal molecules 70. Thus, an alignment direction of liquid crystal molecules changes according to the direction and the intensity of an electric field resulting from the applied voltage. Optical properties of the layer of liquid crystal molecules 70 depends on the alignment state of the liquid crystal molecules 70 so as to in a effect be a kind of electrical light modulator. Therefore, the LCD device displays images by blocking or transmitting light using the layer of liquid crystal molecules 70 as an electrical light modulator.

Although not shown, first and second polarizers, which transmit light parallel to polarization axis, are disposed on outer sides of both the first and second substrates 80 and 10, respectively. A backlight unit (not shown) is disposed under the one of the polarizers as a light source.

FIG. 2 is a schematic plan view showing an array substrate for an active matrix LCD device according to the related art. As shown in FIG. 2, a gate line 13 and a data line 30 cross each other to define a pixel region "P," and a TFT "Tr" is disposed at a crossing of the gate line 13 and the data line 30. A scan signal and an image signal are supplied to the gate line 13 and the data line 30 from an external circuit (not shown), respectively. The switching element TFT "Tr" is connected to the gate line 13, the data line 30, and a pixel electrode 60 in the pixel region The TFT "Tr" includes a gate electrode 15, an active layer 23, and source and drain electrodes 33 and 36. The gate electrode 15 is connected to the gate line 13. The source and drain electrodes 33 and 36 are formed to overlap the gate electrode 15 and are spaced apart from each other on the active layer 23. The active layer 23 may be formed of one of amorphous silicon (a-Si:H) and polycrystalline silicon. For example, the active layer 23 in FIG. 2 can be made of amorphous silicon. The source electrode 33 is connected to the data line 30 and the drain electrode 36 is connected to the pixel electrode 60 in the pixel region "P." Although not shown, gate and data pads are at end portions of the gate and data lines 13 and 30, respectively.

A first storage electrode 14 occupies a portion of the gate line 13 of an adjacent pixel and a second storage electrode 31 is disposed over the first storage electrode 14. The pixel electrode 60 extends over the second storage electrode 31 and is connected to the second storage electrode 31 via a storage contact hole 49. The first and second storage electrodes 14 and 31 together with an intervening insulating layer (not shown) constitute a storage capacitor "CST" for maintaining an applied voltage until next signal is applied to the pixel electrode 60.

When static electricity occurs or a foreign material adheres to the array elements, such as the TFT "Tr", the gate line 13 or the data line 30, signals cannot be normally applied to the gate line 13 and the data line 30. Therefore, the TFT "Tr" may not be normally turned ON/OFF, so that the LCD device has dead pixels that can be recognized by users as a point defect, such as a bright point or a dark point. Too many dead pixels make a bad product that can not be sold. The LCD device has at least several thousand pixels to several million pixels. Consequently, a small amount of dead pixels can occur and the LCD device can still be seen as a good product. To reduce the appearance of dead pixels, repairs can be made.

In a normally white mode LCD device, when a voltage is not applied to the pixel, the pixel is in a white state. In contrast, when the voltage is applied to the pixel of a normally white mode LCD device, brightness of the pixel is controlled in accordance with the intensity of the applied voltage by controlling transmitted light. For example, when a voltage with a maximum value is applied to the pixel, the pixel is in a black state due to blocking light transmission. When the point defect of a bright point occurs due to a dead pixel, it is easily recognized by users.

A repair process should be at least be performed on a bright point so that the dead pixels can be maintained as a dark point to reduce recognition of the dead pixel by users. A bright point can be repaired by repeatedly applying a gate voltage to the dead pixel because the layer of liquid crystal molecules in a pixel inherently acts a capacitor so that the gate voltage is maintained until the next application of the gate voltage.

When the point defect is a dark point, a repair process is not needed as much for a bright point because a dark point is not as noticeable to a user.

FIG. 3 is a schematic plan view showing a repairing process of the array substrate for the LCD of FIG. 2 according to the related art. As shown in FIG. 3, when the pixel "P" of a normally white mode LCD device is determined to be dead, the drain electrode 36 of the dead pixel "P" is cut using a laser. Next, the pixel electrode 60 is connected to the first storage electrode 14 through the storage contact hole 49 using a laser. Accordingly, the repaired pixel electrode 60 receives the gate voltage applied to the gate line 13 of an adjacent pixel through the first storage electrode 14. Therefore, since a gate voltage is repeatedly applied to the repaired pixel electrode 60 that is disconnected from the transistor Tr, the pixel is changed into a dark point and the inherent capacitance of the pixel maintains the dark point until the gate voltage is applied again.

When the LCD device is a normally black mode, the dead pixel may be repaired by cutting the drain electrode 36 of the pixel without connecting the pixel electrode 60 to the first storage electrode 14. Because an LCD with good image quality is in demand, a method for repairing both dark spots and bright spots is needed. More specifically, a method for restoring both dark spots and bright spots into active pixels is needed.

SUMMARY OF THE INVENTION

Accordingly, the present invention is directed to an array substrate for an LCD, a method of fabricating an array substrate for an LCD, and a repairing method of an array substrate for an LCD.

An object of the present invention is to provide an array substrate for an LCD, a method of fabricating an array substrate for an LCD, and a repairing method of an array substrate for an LCD device that can increase the image quality by providing an improved repair process.

An object of the present invention is to provide an array substrate for an LCD, a method of fabricating an array substrate for an LCD, and a repairing method of an array substrate for an LCD device that can repair both bright spots and dark spots.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, an array substrate for a liquid crystal display device includes a gate line and a first storage electrode on a substrate, a data line crossing the gate line to define a first pixel region, a thin film transistor connected to the gate line and the data line, a second storage electrode over the first storage electrode, a first pixel electrode in the first pixel region, the first pixel electrode connected to the thin film transistor and the second storage electrode, the second storage electrode including a first portion over the first storage electrode and a second portion in a second pixel region adjacent to the first pixel region, and a repair pattern for the first pixel region between the second storage electrode and a second pixel electrode in the second pixel region.

In another aspect, an array substrate for a liquid crystal display device includes a gate line and a first storage electrode on a substrate, a data line crossing the gate line to define a first pixel region, a thin film transistor connected to the gate line and the data line, a second storage electrode over the first storage electrode; and a first pixel electrode in the first pixel region, the first pixel electrode connected to the thin film transistor and the second storage electrode, the second storage electrode including a first portion over the first storage electrode and a second portion overlapped by a second pixel electrode in a second pixel region adjacent to the first pixel region.

In another aspect, an array substrate for a liquid crystal display device includes a gate line and a first storage electrode on a substrate, a data line crossing the gate line to define a first pixel region, a first thin film transistor connected to the gate line and the data line, a second storage electrode over the first storage electrode, a first pixel electrode in the first pixel region, the first pixel electrode connected to the second storage electrode, the second storage electrode including a first portion over the first storage electrode and a second portion in a second pixel region adjacent to the first pixel region; and a repair pattern for the first pixel region between the second storage electrode and a second pixel electrode in the second pixel region, wherein the first pixel electrode is connected to the second pixel electrode through the repair pattern.

In another aspect, an array substrate for a liquid crystal display device includes a gate line and a first storage electrode on a substrate, a data line crossing the gate line to define a first pixel region, a first thin film transistor connected to the gate line and the data line, a second storage electrode over the first storage electrode, and a first pixel electrode in the first pixel region, the first pixel electrode connected to the second storage electrode, the second storage electrode including a first portion over the first storage electrode and a second portion overlapped by a second pixel electrode in a second pixel region adjacent to the first pixel region, wherein the first pixel electrode is connected to the second pixel electrode through the second storage electrode.

In another aspect, a method of fabricating an array substrate for a liquid crystal display device includes forming a gate line and a first storage electrode on a substrate, forming a data line crossing the gate line to define a first pixel region, forming a thin film transistor connected to the gate line and the data line, forming a second storage electrode over the first storage electrode, forming a first pixel electrode in the first pixel region, the first pixel electrode connected to the thin film transistor and the second storage electrode, the second storage electrode including a first portion over the first storage electrode and a second portion in a second pixel region adjacent to the first pixel region, and forming a repair pattern for the first pixel region between the second storage electrode and a second pixel electrode in the second pixel region.

In another aspect, a method of fabricating an array substrate for a liquid crystal display device includes forming a gate line and a first storage electrode on a substrate, forming a data line crossing the gate line to define a first pixel region, forming a thin film transistor connected to the gate line and the data line, forming a second storage electrode over the first storage electrode, and forming a first pixel electrode in the first pixel region, the first pixel electrode connected to the thin film transistor and the second storage electrode, the second storage electrode including a first portion over the first storage electrode and a second portion in a second pixel region adjacent to the first pixel region, the second storage electrode including a first portion over the first storage electrode and a second portion overlapped by a second pixel electrode in a second pixel region adjacent to the first pixel region.

In another aspect, a repairing method of an array substrate for a liquid crystal display device, which includes a gate line and a first storage electrode on a substrate; a data line crossing the gate line to define a first pixel region; a first thin film transistor connected to the gate line and the data line; a second storage electrode over the first storage electrode; and a first pixel electrode in the first pixel region, the first pixel electrode connected to the first thin film transistor and connected to the second storage electrode, the second storage electrode including a first portion over the first storage electrode and a second portion in a second pixel region adjacent to the first pixel region having a second pixel electrode that includes cutting a connection between the first pixel electrode and the first thin film transistor, and electrically connecting the second storage electrode to the second pixel electrode.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principle of the invention. In the drawings.

DETAILED DESCRIPTION OF THE PREFERRED EMBODIMENTS

Reference will now be made in detail to the preferred embodiments of the present invention, examples of which are illustrated in the accompanying drawings.

Figure 1:
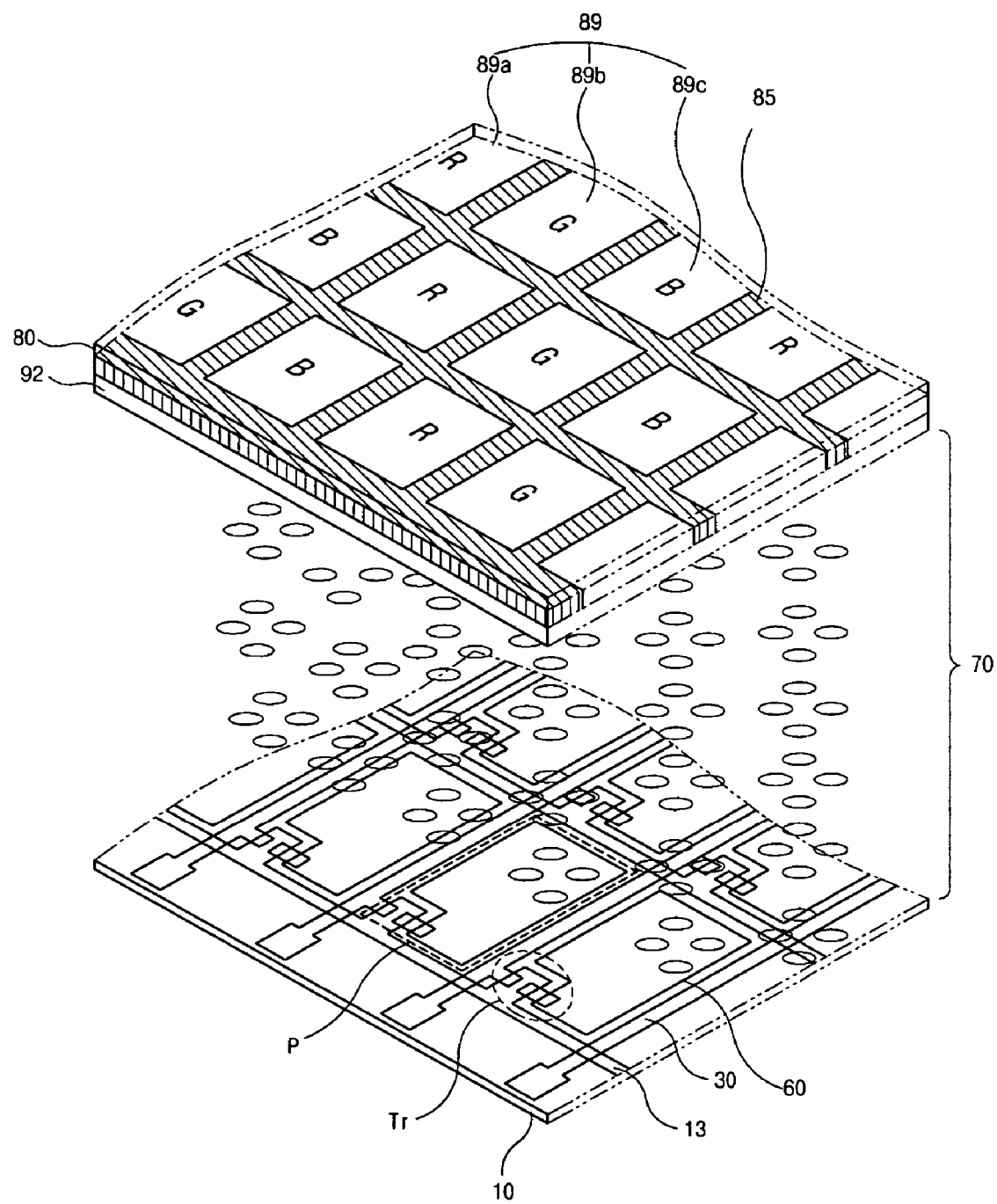
FIG. 1 is a schematic perspective view of an active matrix liquid crystal display device according to the related art.
Figure 2:
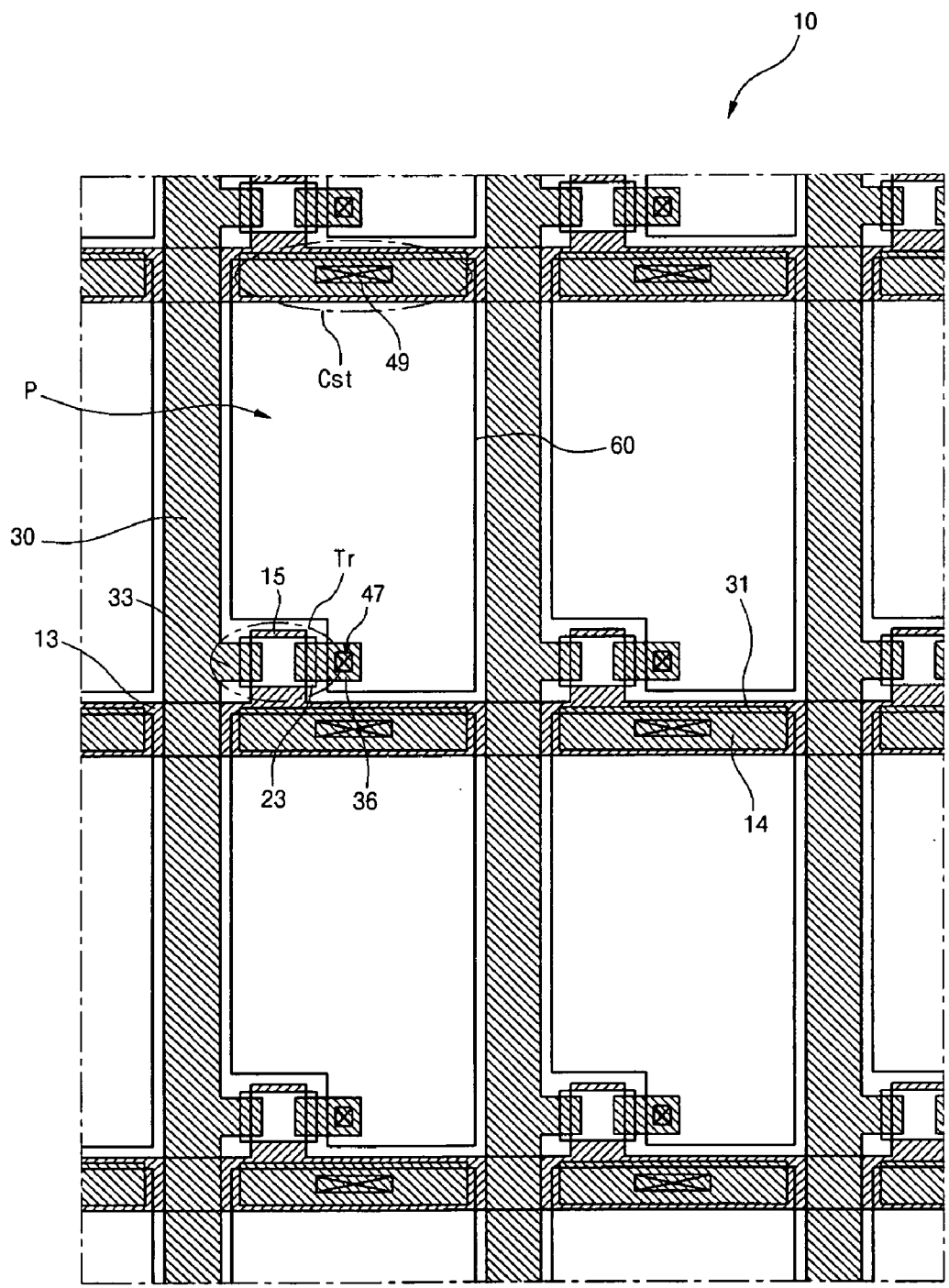
FIG. 2 is a schematic plan view showing an array substrate for an active matrix LCD device according to the related art.
Figure 3:
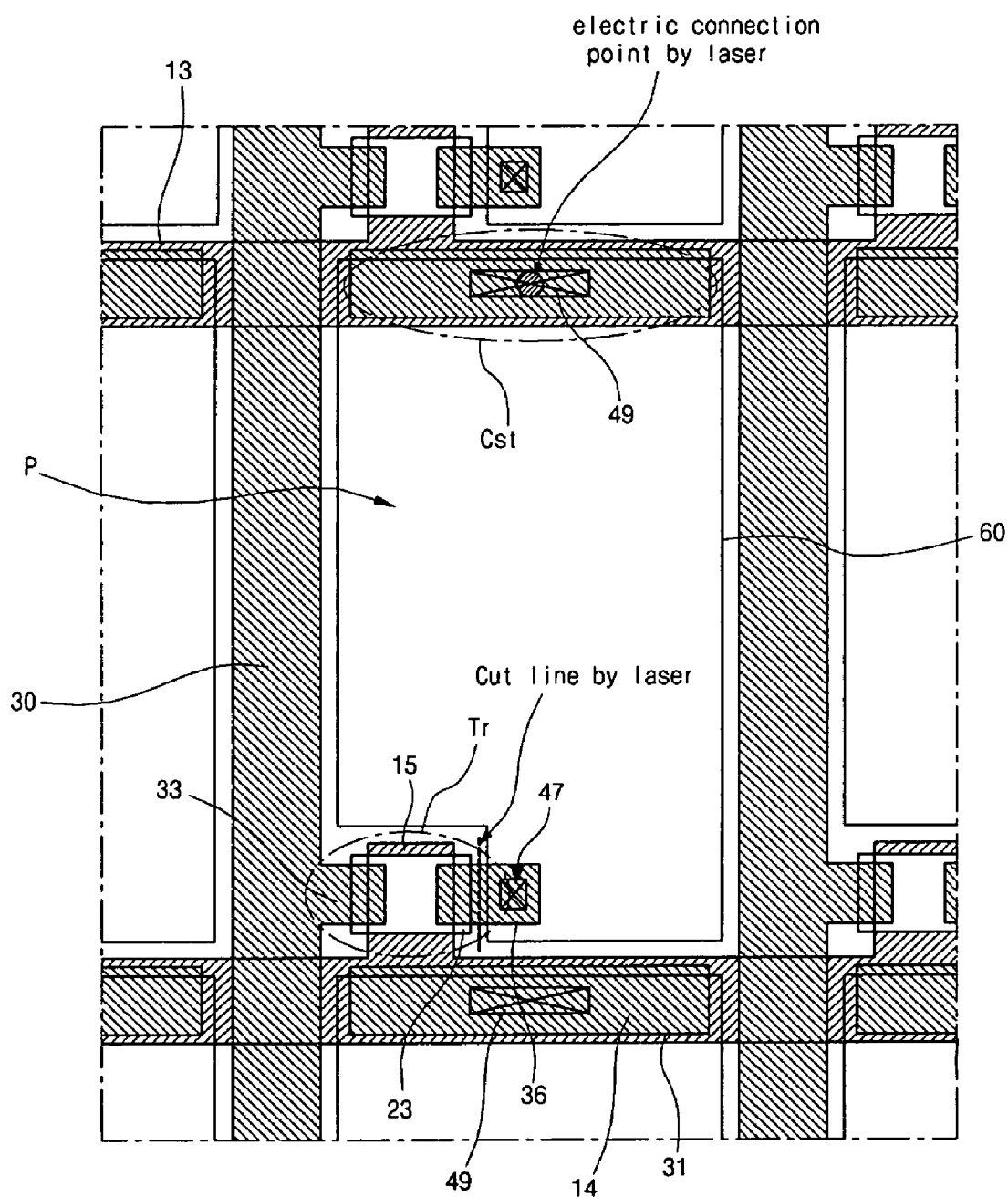
FIG. 3 is a schematic plan view showing a repairing process of the array substrate for the LCD of FIG. 2 according to the related art.
Figure 4:
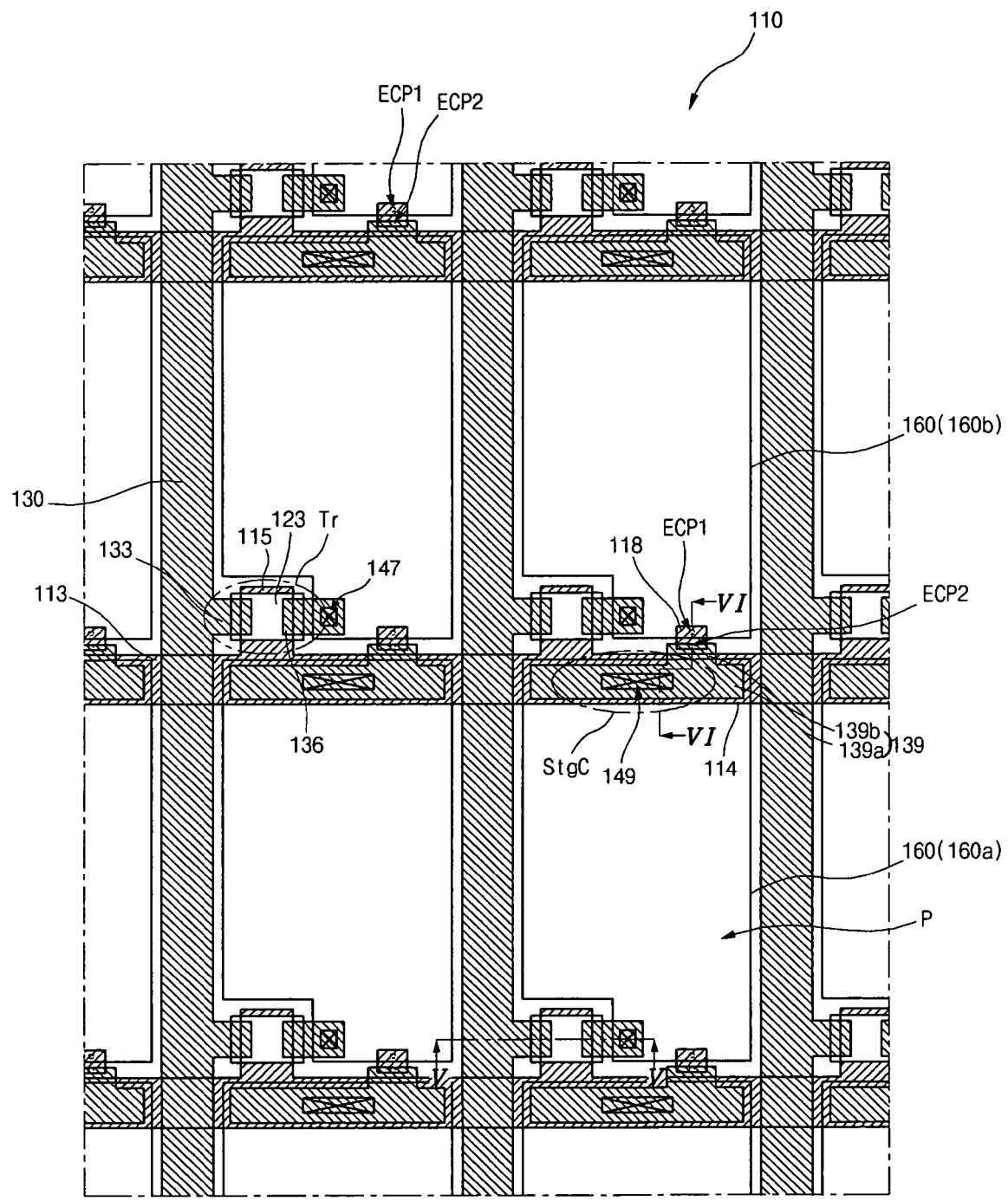
FIG. 4 is a schematic plane view showing an array substrate for an LCD device according to a first embodiment of the present invention.

FIG. 4 is a schematic plan view showing an array substrate for an LCD device according to a first embodiment of the present invention. For convenience sake, to distinguish a pixel electrode from an adjacent pixel electrode, a reference number of the pixel electrode is referred to as 160a, and a reference number of the adjacent pixel electrode is as 160b. As shown in FIG. 4, a gate line 113 is formed along a first direction, a data line 130 is formed along a second direction crossing the first direction, a TFT "Tr" is connected to the gate line 113 and the data line 130, a pixel electrode 160 is connected to the TFT "Tr," a storage capacitor "CST" is overlaps the pixel electrode 160.

The TFT "Tr" includes a gate electrode 115 connected to the gate line 113, a semiconductor layer 123 over the gate electrode 115, a source electrode 133 connected to the data line 130, and a drain electrode 136 spaced apart from the source electrode 133 and overlapping the semiconductor layer 123. The storage capacitor "CST" includes a first storage electrode 114 occupying a portion of the gate line 113 of an adjacent pixel, and a second storage electrode 139 over the first storage electrode 113 connected to the pixel electrode 160a with an intervening insulating layer (not shown) between the first and second storage electrodes 113 and 139. More particularly, the second storage electrode 139 includes a first portion 139a over the first storage electrode 113 and a second portion 139b extending into an adjacent pixel. For convenience sake, only the structure of one pixel region "P," as shown in FIG. 4, is described. However, there are a plurality of pixels in an LCD device, and thus the gate line 113, the data line 130, the TFT "Tr," the pixel electrode 160 and the storage capacitor "CST" also exist in plural numbers.

A repair pattern 118 is disposed between the pixel electrode 160a and the second storage electrode 139. For example, the repair pattern 118 has an island shape. First and second end portions of the repair pattern 118 are overlapped by the pixel electrode 160a and the second storage electrode 139b, respectively. The overlap areas "ECP1" and "ECP2" are defined where the repair pattern 118 is overlapped by the pixel electrode 160a and where the repair pattern 118 is overlapped by the second storage electrode 139b. A passivation layer 145 and a gate insulating layer 120 are between the repair pattern 118 and the pixel electrode 160a in the overlap area "ECP1." A gate insulating layer 120 is between the repair pattern 118 and the second storage electrode 139b in the overlap portion "ECP2". The repair pattern 118 can be formed in the same layer as the gate line 113 and be formed of the same material as the gate line 113. Similarly, the first storage electrode 114 can be formed of the same material as the gate line 113. Further, the second storage electrode 139 can be formed of the same material as the data line 130.

Although not shown, a passivation layer is formed between the TFT "Tr" and the pixel electrode 160a and between the second storage electrode 139 and the pixel electrode 160a. The passivation layer 145 has a drain contact hole 147 that exposes a portion of the drain electrode 136 that is connected to the pixel electrode 160a. Further, the passivation layer 145 has a storage contact hole 149 that exposes a portion of the second storage electrode 139 that is connected to the pixel electrode 160a. The second storage electrode 139 can have a shape like "T."

When the pixel having the pixel electrode 160a corresponds to a dead pixel, the drain electrode 136 connected to the pixel electrode 160a is cut using a laser. Further, the second storage electrode 139 is connected to the repair pattern 118 and the adjacent pixel electrode 160b is connected to the repair pattern 118. In other words, by irradiating the overlap areas "ECP1" and "ECP2" of the repair pattern 118 overlapped by the adjacent pixel electrode 160b and the second storage electrode 139 with a laser, the pixel electrode 160a via the second storage electrode 139 and the repair pattern 118 is connected to the adjacent pixel electrode 160b.

In the repair process according to the related art, the pixel electrode in the dead pixel is disconnected from the drain electrode of the dead pixel and then the pixel electrode is connected to the first storage electrode of an adjacent pixel to fix bright spots. In contrast, the repair process according to embodiments of the present invention disconnects the pixel electrode of the dead pixel from the drain electrode of the dead pixel and connects an adjacent pixel electrode 160b and the second storage electrode 139b to a repair pattern 118 such that the pixel electrode 160a is connected to the adjacent pixel electrode 160b via the second storage electrode 139b and the repair pattern 118. Thus, the repaired pixel electrode 160a in the dead pixel can be driven by being electrically connected to the adjacent pixel electrode 160b.

Figure 5:
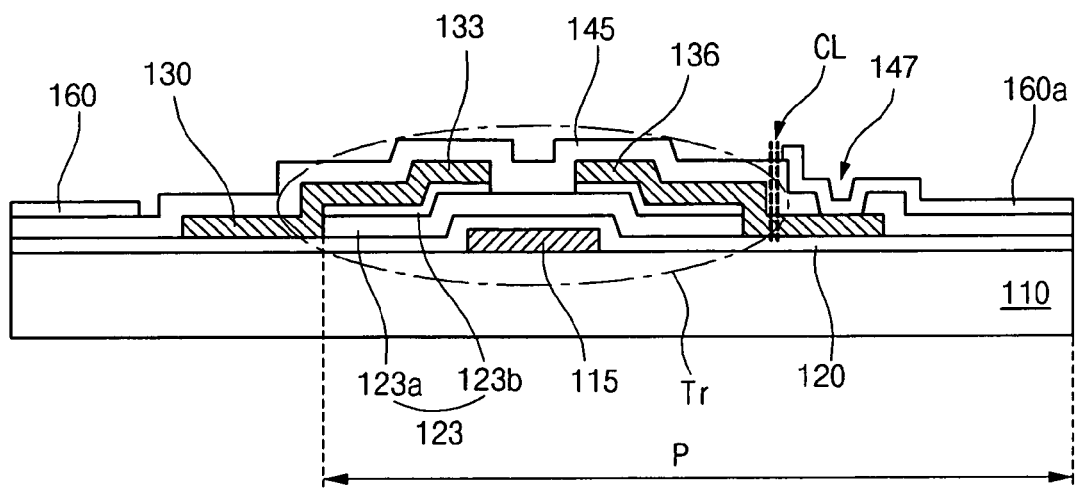
FIGS. 5 and 6 are schematic cross-sectional views showing a repairing process of an array substrate for an LCD device taken along lines "V-V" and "VI-VI" of FIG. 4.
Figure 6:
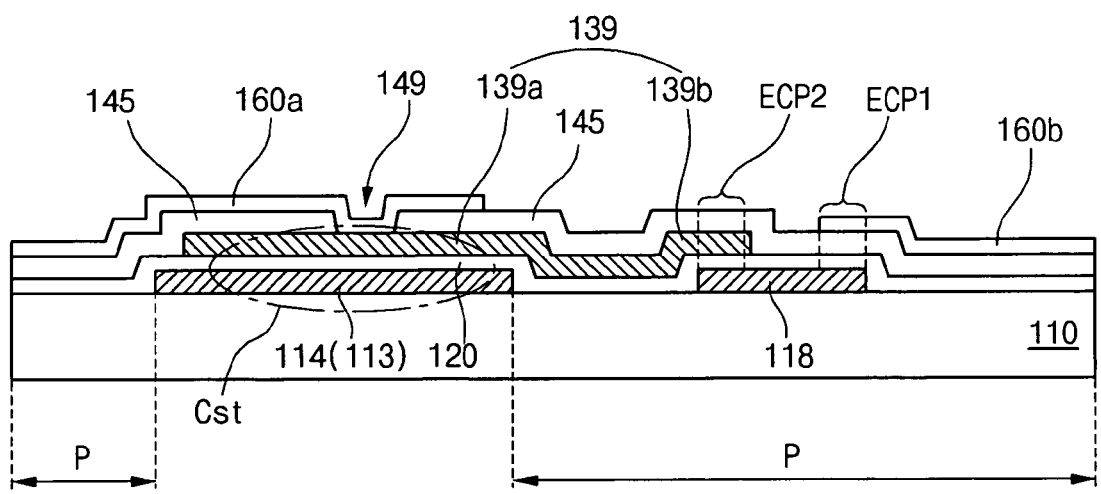

FIGS. 5 and 6 are schematic cross-sectional views showing a repairing process of an array substrate for an LCD device taken along lines "V-V" and "VI-VI" of FIG. 4. As shown in FIG. 5, the drain electrode 136 of a dead pixel is cut using a laser along a cut line "CL." The cut electrically isolates the pixel electrode 160a from the drain electrode 136.

As shown in FIG. 6, the repair pattern 118 is formed in the same layer as the first storage electrode 114. A gate insulating layer 120 is formed on the first storage electrode 114 and the repair pattern 118. The second storage electrode 139 is formed on the gate insulating layer 120. The first portion 139a of the second storage electrode 139 is disposed over the first storage electrode 114 and the second portion 139b of the second storage electrode 139 overlaps one end portion of the repair pattern 118. The first storage electrode 114 and the second storage electrode 139 together with the gate insulating layer 120 as an intervening insulating layer form a storage capacitor "CST." A passivation layer 145 is formed on the second storage electrode 139. The passivation layer 145 has a storage contact hole 149 that exposes a portion of the second portion 139b of the second storage electrode 139. The adjacent pixel electrode 160b is formed on the passivation layer 145 and overlaps the repair pattern 118. The pixel electrode 160a is connected to the first portion 139a of the second storage electrode 139 via the storage contact hole 149.

The adjacent pixel electrode 160b is connected to the second storage electrode 139 through the repair pattern 118 by irradiating a laser into the overlap areas "ECP1" and "ECP2" at end portions of the repair pattern 118. More specifically, the adjacent pixel electrode 160b is connected through the gate insulating layer 120 and the passivation layer 145 to the repair pattern 118 with laser energy. Similarly, the second portion 139b of the second storage electrode 139 is connected through the gate insulating layer 120 to the repair pattern 118 with laser energy. By electrically connecting the adjacent pixel electrode 160b and the repair pattern 118 and electrically connecting the repair pattern 118 and the second storage electrode 139 of the pixel, the pixel electrode 160a can be electrically connected to the adjacent pixel electrode 160b so as to activate the pixel electrode 160a like the adjacent pixel electrode 160b. Since the pixels disposed at top and bottom positions typically have a similar color and gray level, the displayed image is improved as compared to a case when one of the pixels is a dark spot.

A dead pixel according to the related art is repaired by making the dead pixels a dark point whereas a dead pixel is repaired according to embodiments of the present invention by electrically connecting the pixel electrode of a dead pixel to an adjacent pixel electrode. Therefore, an improved image quality is obtained as compare to leaving dead pixels as dark spots. Further, since the repair pattern of the first embodiment is formed in the same process as the gate line, a separate fabrication process for the repair pattern is not needed, thereby reducing manufacturing cost.

Figure 7A:
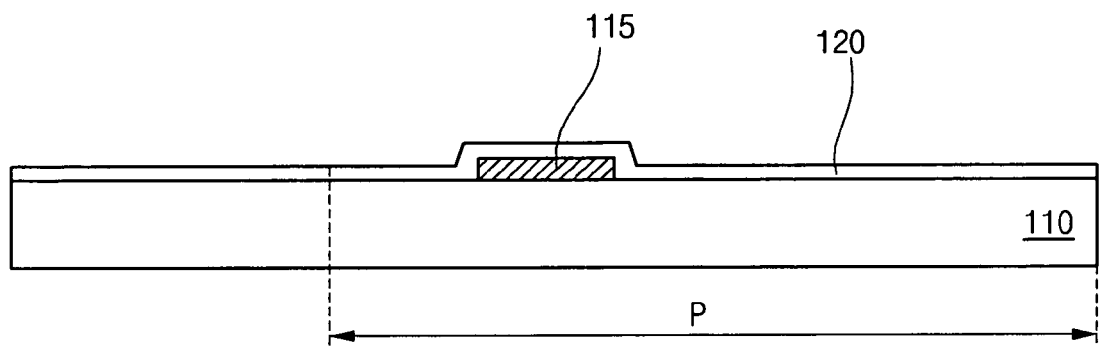
FIGS. 7A to 7E and FIGS. 8A to 8E are schematic cross-sectional views showing a manufacturing process of the array substrate for the LCD device taken along lines "V-V" and "VI-VI" of FIG. 4.
Figure 7B:
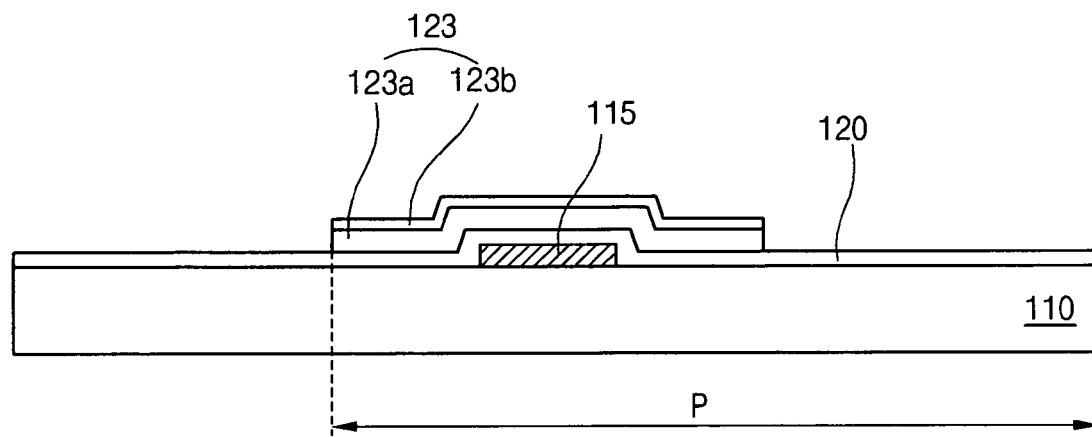
Figure 7C:
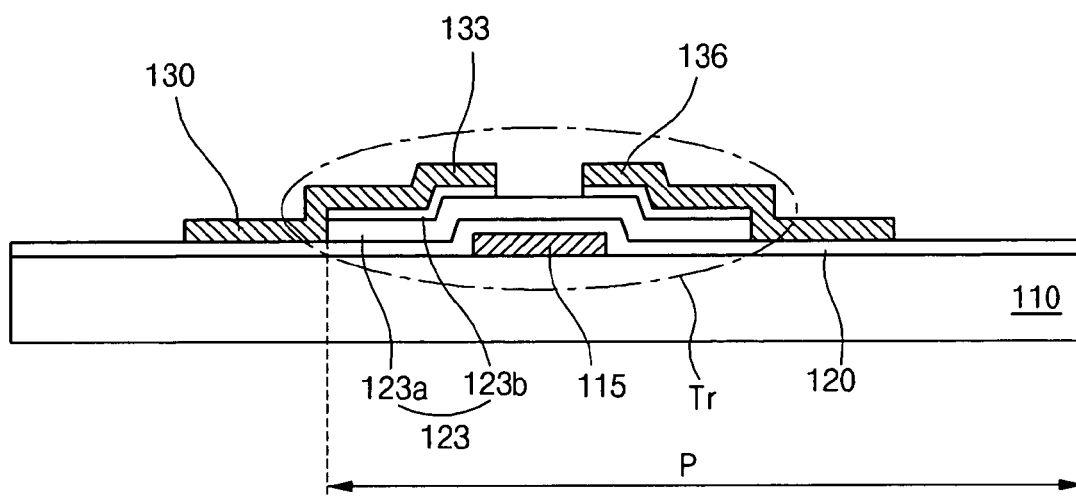
Figure 7D:
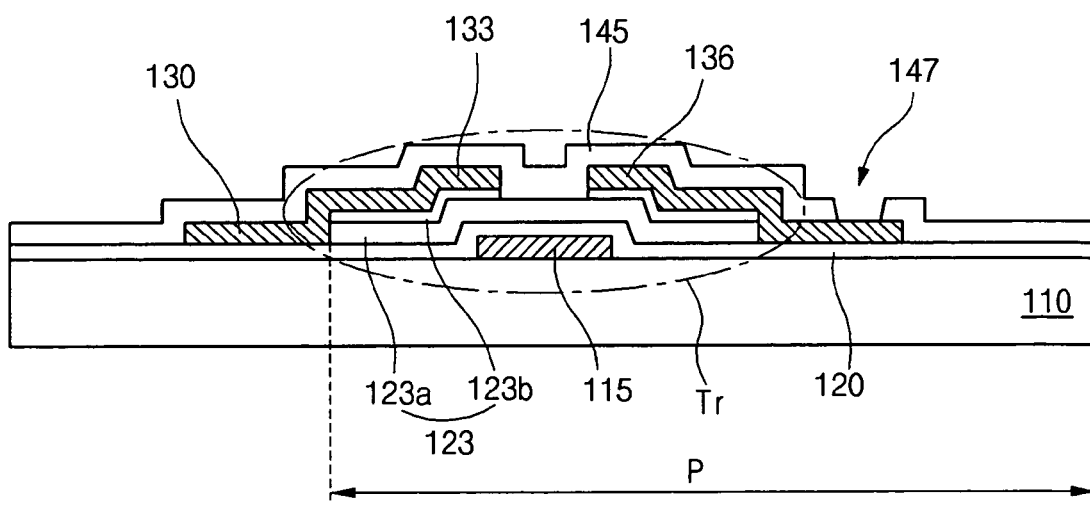
Figure 7E:
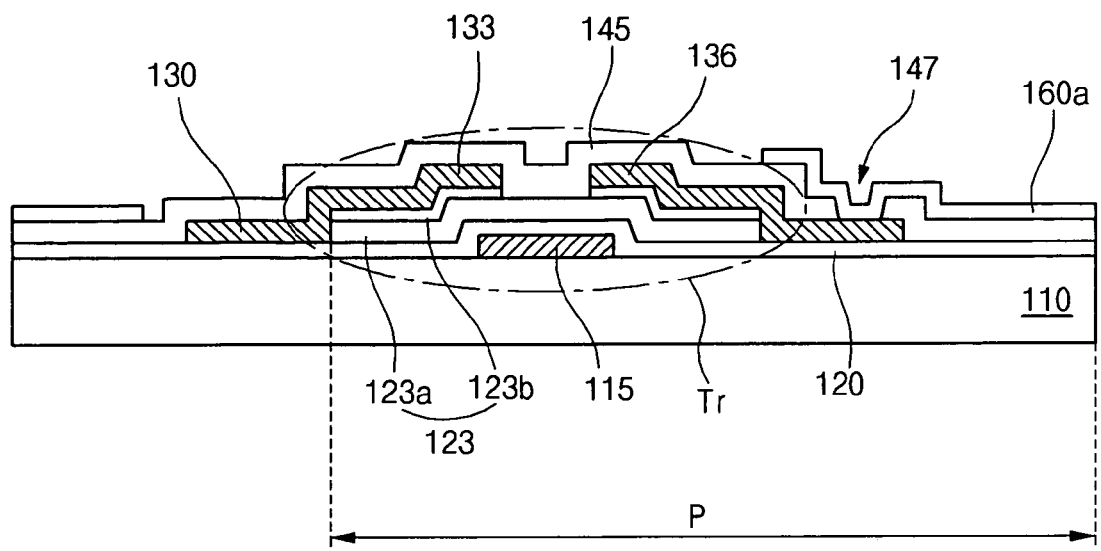
Figure 8A:
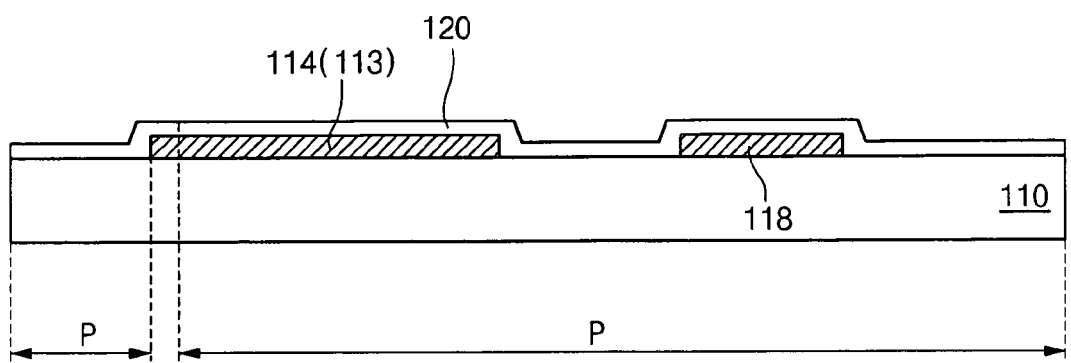

FIGS. 7A to 7E and FIGS. 8A to 8E are schematic cross-sectional views showing a manufacturing process of the array substrate for the LCD device taken along lines "V-V" and "VI-VI" of FIG. 4. As shown in FIGS. 7A and 8A, the gate electrode 115, the first storage electrode 114 and the repair pattern 118 are formed on the substrate 110, and a gate insulating layer 120 is formed on the gate electrode 115, the first storage electrode 114 and the repair pattern 118. Although not shown, forming the gate electrode 115, the first storage electrode 114 and the repair pattern 118 may include depositing a metallic material on the substrate 110 to form a metal layer, coating a photoresist (PR) layer on the metal layer, patterning the PR layer to form a PR pattern and etching the metal layer using the PR pattern as a mask through a photolithography. The gate insulating layer 120 includes an inorganic insulating material, such as silicon oxide (SiOx) or silicon nitride (SiNx).

Figure 8B:
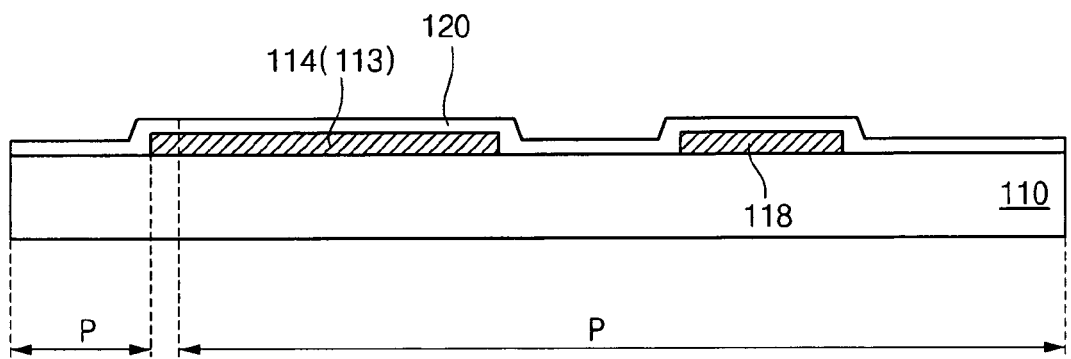

As shown in FIGS. 7B and 8B, an active layer 123a and an ohmic contact layer 123b are sequentially formed on the gate insulating layer 120 over the gate electrode 115. The active layer 123a and the ohmic contact layer 123b constitute a semiconductor layer 123. The active layer 123a includes an intrinsic amorphous silicon, and the ohmic contact layer 123b includes doped amorphous silicon.

Figure 8C:
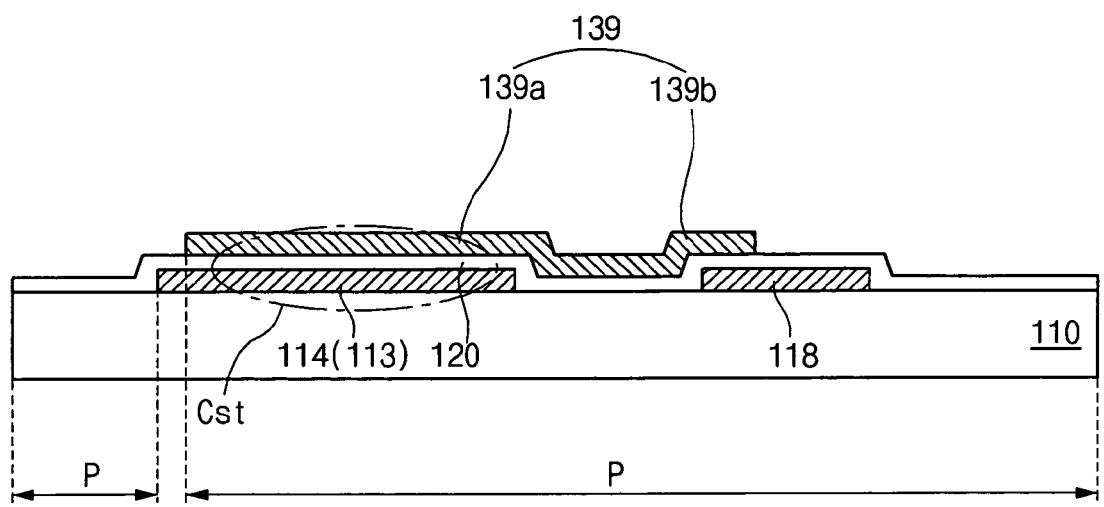

As shown in FIGS. 7C and 8C, the source electrode 133 and the drain electrode 136 are formed on the semiconductor layer 123 over the gate electrode 115, and the second storage electrode 139 are formed on the gate insulating layer 120 over the first storage electrode 114 and the repair pattern 118. The source and drain electrodes 133 and 136 are spaced apart from each overlapping the semiconductor layer 123. Although not shown, a portion of the ohmic contact layer 123b corresponding to a space between the source and drain electrodes 133 and 136 is removed and a portion of the active layer 123a is exposed from the space between the source and drain electrodes 133 and 136 to form a channel region in the space. The gate electrode, the semiconductor layer, the source and the drain electrodes constitute a TFT "Tr."

The second storage electrode 139 has the first portion 139a substantially corresponding to the first storage electrode 114 and the second portion 139b overlapping a first end portion of the repair pattern 118. The second storage electrode 139 can have a shaped like "T." As shown in FIG. 4, the second storage electrode 139 substantially has a "⊥" shape, which is a mirror image of a "T" shape. The first storage electrode 114 and the second storage electrode 139 along with the gate insulating layer 120 as an intervening insulating layer form a storage capacitor "CST."

Figure 8D:
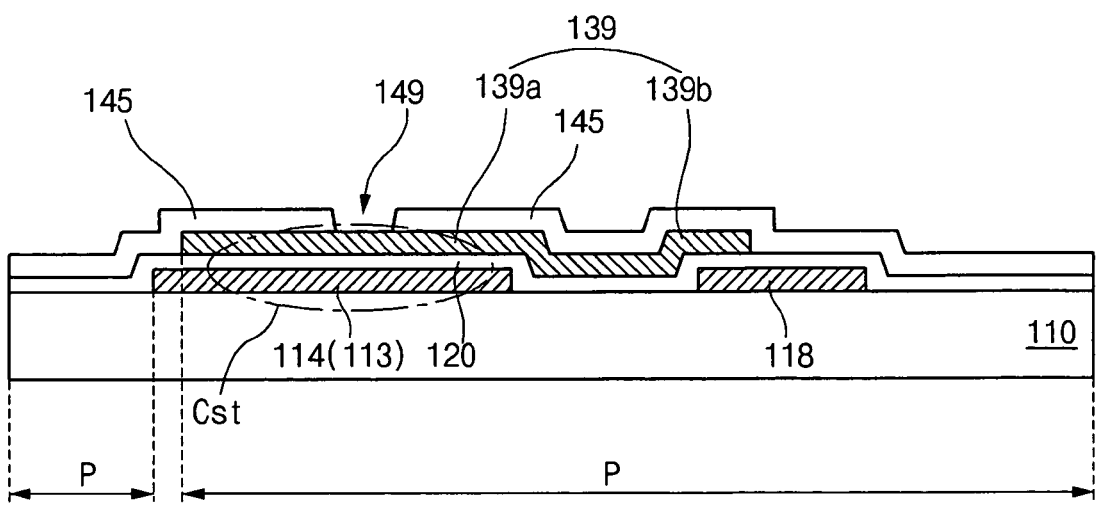

As shown in FIGS. 7D and 8D, the passivation layer 145 is formed on the TFT. The passivation layer 145 includes an organic insulating material or an inorganic insulating material. The passivation layer 145 has a drain contact hole 147 exposing a portion of the drain electrode 133 and a storage contact hole 149 exposing a portion of the second storage electrode 139.

Figure 8E:
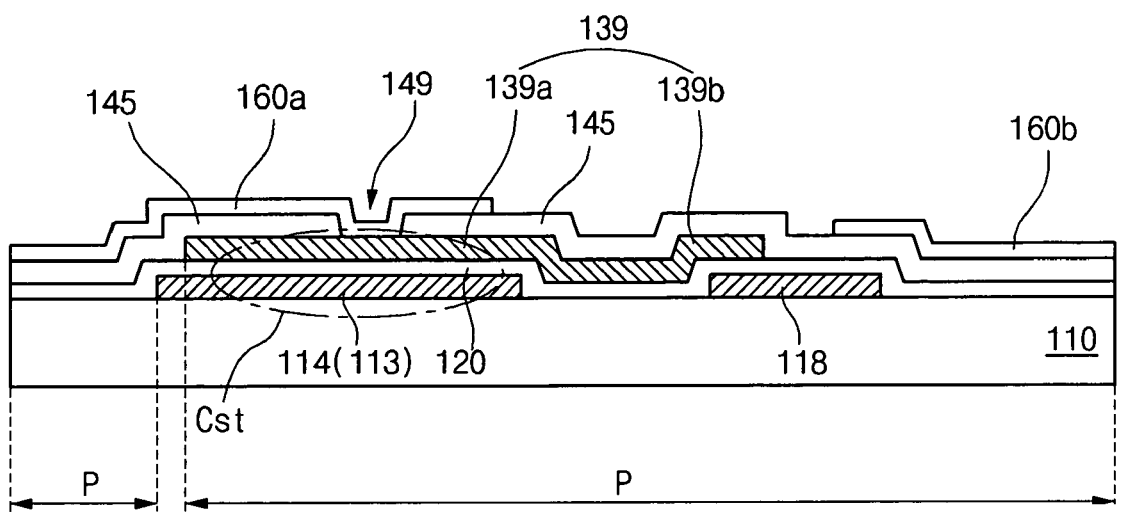

As shown in FIGS. 7E and 8E, the pixel electrode 160a and the adjacent pixel electrode 160b are formed on the passivation layer 145. The pixel electrode 160 includes a transparent conductive material, such as indium tin oxide (ITO) and indium zinc oxide (IZO). The pixel electrode 160a is connected to the drain electrode 133 via the drain contact hole 147 and the pixel electrode 160a is connected to the second storage electrode 139 via the storage contact hole 149.

Although FIGS. 7A to 7E and FIGS. 8A to 8E disclose fabricating the array substrate through a five mask processes, the array substrate of the present invention may be manufactured through a five mask process by having the semiconductor layer and the data patterns (the data line, the source electrode, the drain electrode and the second storage electrode) formed through one mask process using a half-tone mask or a diffraction exposure mask.

Figure 9:
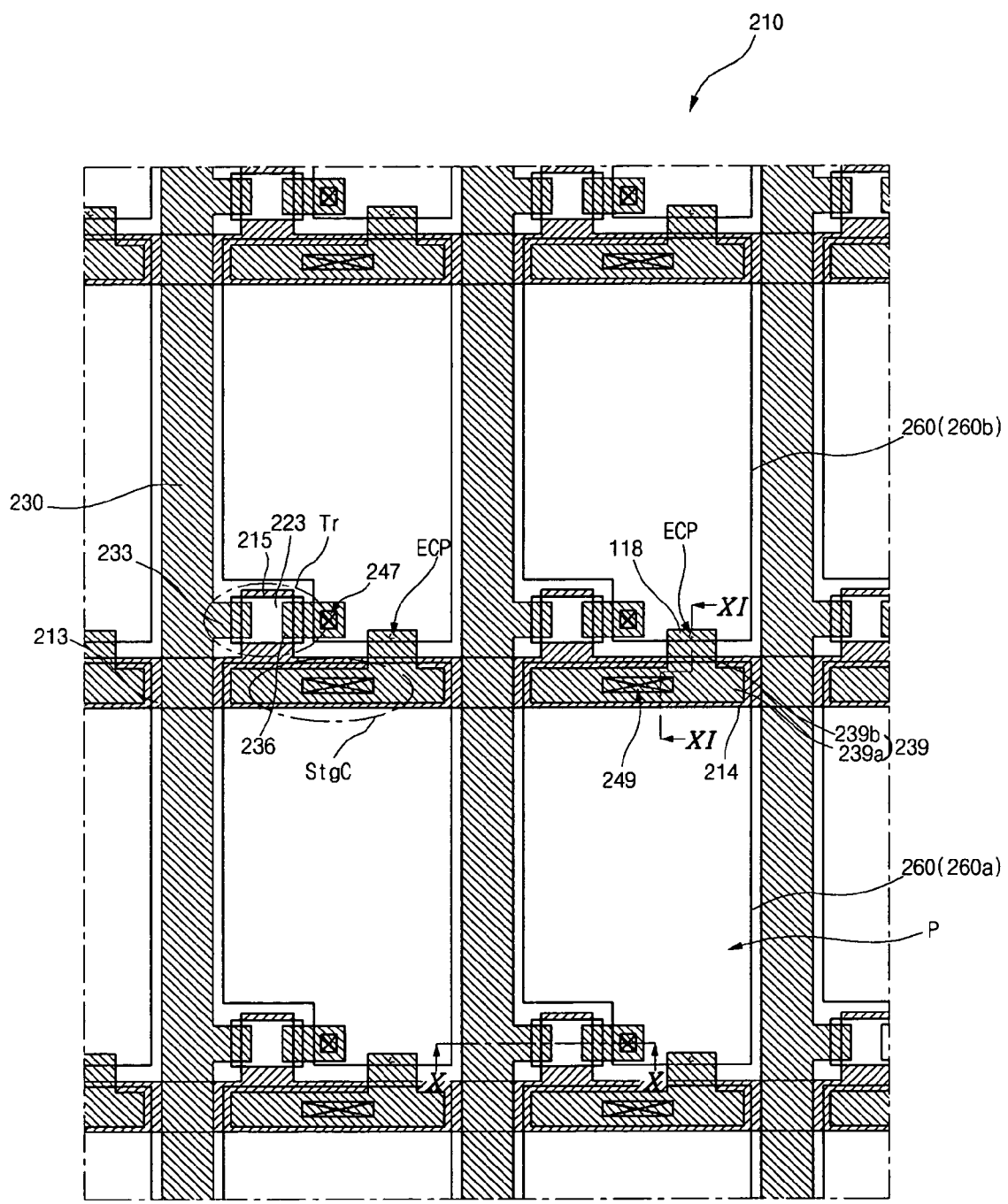
FIG. 9 is a schematic plan view of an array substrate for an LCD according to a second embodiment of the present invention.

FIG. 9 is a schematic plan view of an array substrate for an LCD according to a second embodiment of the present invention. As shown in FIG. 9, a gate line 213 and a data line 230 cross each other to define a pixel "P." A TFT "Tr," is connected to the gate line 213 and the data line 230, and a pixel electrode 260 is connected to the TFT "Tr." The TFT "Tr" includes a gate electrode 215, a semiconductor layer 223, a source electrode 233, and a drain electrode 236. A first storage electrode 214 occupies a portion of the gate line 213 for an adjacent pixel. A second storage electrode 239 has a first portion 239a over the first storage electrode 214 and a second portion 239b overlapped by an adjacent pixel electrode 260b. In other words, the second storage electrode 239 for the pixel "P" has the second portion 239b overlapped by the adjacent pixel electrode 260b in an adjacent pixel. The first portion 239a of the second storage electrode 239 is connected to the pixel electrode 260a via a storage contact hole 249.

Figure 10:
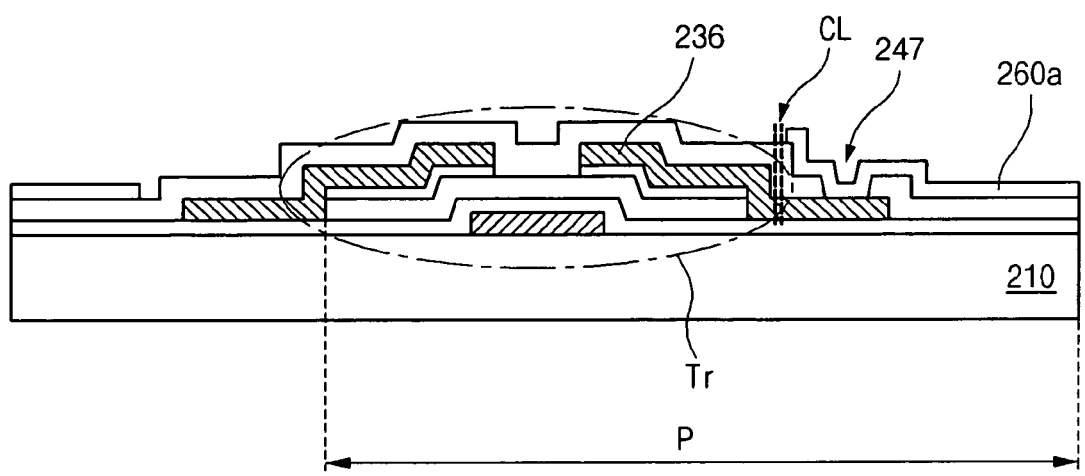
FIGS. 10 and 11 are schematic cross-sectional views showing a repairing process of an array substrate for an LCD device taken along lines "X-X" and "XI-XI" of FIG. 9.
Figure 11:
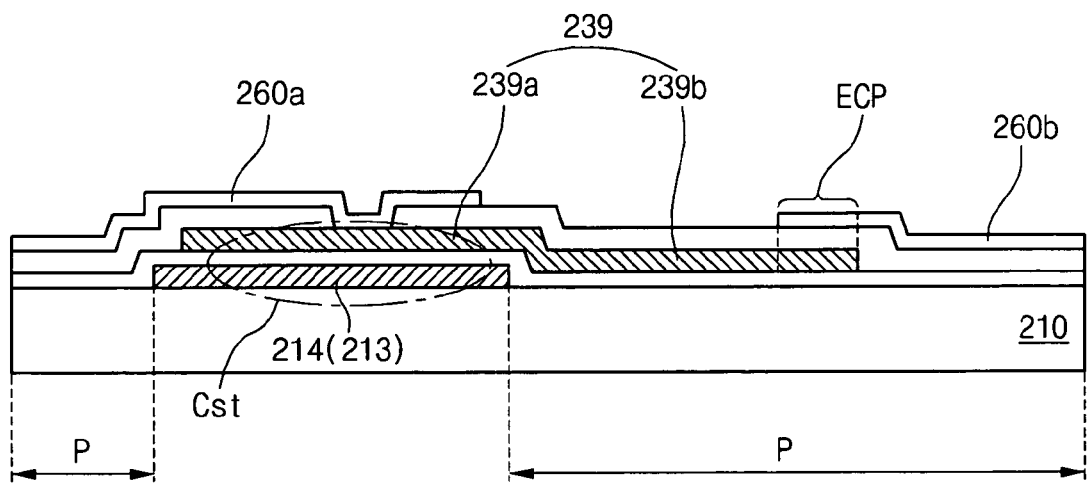

FIGS. 10 and 11 are schematic cross-sectional views showing a repairing process of an array substrate for an LCD device taken along lines "X-X" and "XI-XI" of FIG. 9. When the pixel "P" having the pixel electrode 260a in FIGS. 10 and 11 is recognized as a dead pixel, the drain electrode 236 is cut along a cut line "CL." Further, the overlap area "ECP" between the second portion 239b of the second storage electrode 239 of the pixel "P" and the adjacent pixel electrode 260b is irradiated by a laser to form an interconnection between the second storage electrode 239 and the adjacent pixel electrode 260b. The first storage electrode 214 and the second storage electrode 239 together with the gate insulating layer 220 as an intervening insulating layer form a storage capacitor "CST."

The second embodiment of the present invention has the adjacent pixel electrode overlapping the second storage electrode of the pixel without the repair pattern such that the adjacent pixel electrode and the second storage electrode of the pixel can be connected in a repair process. In other words, the pixel having a point defect is repaired by connecting the pixel electrode of a dead pixel to an adjacent pixel electrode. Therefore, since the repaired pixel electrode is utilized, an image quality of the LCD can be improved.

The array substrate for the LCD device according to embodiments of the present invention can have a repair pattern overlapped by an adjacent pixel electrode and the second storage electrode, or an adjacent pixel electrode overlapping the second storage electrode of the pixel. When a defect occurs in the pixel, the TFT "Tr" of the pixel is disconnected from the pixel electrode by irradiating a laser. Then, the pixel electrode is electrically connected to the adjacent pixel electrode by connecting the adjacent pixel electrode to the second storage electrode of the pixel, or by connecting the adjacent pixel electrode to a repair pattern and electrically connecting the repair pattern to the second storage electrode of the pixel. Consequently, the repaired pixel electrode can be driven along with the adjacent pixel electrode.

It will be apparent to those skilled in the art that various modifications and variations can be made in the LCD device of the present invention without departing from the spirit or scope of the invention. Thus, it is intended that the present invention cover the modifications and variations of this invention provided they come within the scope of the appended claims and their equivalents.

What is claimed is:

1. An array substrate for a liquid crystal display device, comprising:
   a gate line and a first storage electrode on a substrate;
   a data line crossing the gate line to define a first pixel region;
   a thin film transistor connected to the gate line and the data line;
   a second storage electrode over the first storage electrode and disposed on the same layer as the data line, the second storage electrode including a first portion over the first storage electrode and a second portion in a second pixel region adjacent to the first pixel region;
   a first pixel electrode in the first pixel region, the first pixel electrode connected to the thin film transistor and the second storage electrode, the first pixel electrode overlapping the first portion of the second storage electrode; and
   a repair pattern for the first pixel region between the second storage electrode and a second pixel electrode in the second pixel region, the repair pattern partially overlapping the second portion of the second storage electrode and the second pixel electrode.

2. The array substrate according to claim 1, further comprising a gate insulating layer between the gate line and the data line and between the first storage electrode and the second storage electrode.

3. The array substrate according to claim 1, wherein the thin film transistor includes a gate electrode connected to the gate line, a semiconductor layer over the gate electrode, a source electrode connected to the data line and a drain electrode spaced apart from the source electrode.

4. The array substrate according to claim 3, further comprising a passivation layer between the thin film transistor and the first pixel electrode and between the second storage electrode and the first pixel electrode.

5. The array substrate according to claim 4, wherein the passivation layer includes a drain contact hole that exposes a portion of the drain electrode.

6. The array substrate according to claim 5, wherein the first pixel electrode is connected to the drain electrode via the drain contact hole.

7. The array substrate according to claim 4, wherein the passivation layer includes a storage contact hole over a portion of the second storage electrode.

8. The array substrate according to claim 7, wherein the first pixel electrode is connected to the second storage electrode via the storage contact hole.

9. The array substrate according to claim 1, wherein the repair pattern is disposed at the same layer as the gate line.

10. The array substrate according to claim 1, wherein the repair pattern includes the same material as the gate line.

11. The array substrate according to claim 1, wherein the second storage electrode includes the same material as the data line.

12. The array substrate according to claim 1, wherein the first storage electrode occupies a portion of the gate line for the second pixel region.

13. The array substrate according to claim 1, wherein the second storage electrode has a "T" shape.

14. An array substrate for a liquid crystal display device, comprising:
    a gate line and a first storage electrode on a substrate;
    a data line crossing the gate line to define a first pixel region;
    a first thin film transistor connected to the gate line and the data line;
    a second storage electrode over the first storage electrode and disposed on the same layer as the data line, the second storage electrode including a first portion over the first storage electrode and a second portion in a second pixel region adjacent to the first pixel region;

a first pixel electrode in the first pixel region, the first pixel electrode connected to the second storage electrode, the first pixel electrode overlapping the first portion of the second storage electrode; and a repair pattern for the first pixel region between the second storage electrode and a second pixel electrode in the second pixel region, the repair pattern partially overlapping the second portion of the second storage electrode and the second pixel electrode, wherein the first pixel electrode is connected to the second pixel electrode through the repair pattern.

* * * * *